(12) United States Patent
Pham (10) Patent No.: US 7,567,066 B2
(45) Date of Patent: Jul. 28, 2009

(54) INTEGRATED SWITCH WITH INTERNALLY ADJUSTED CONDUCTION TIME

(75) Inventor: Giao Pham, Milpitas, CA (US)

(73) Assignee: Power Integrations, Inc., San Jose, CA (US)

( * ) Notice: Subject to any disclaimer, the term of this patent is extended or adjusted under 35 U.S.C. 154(b) by 368 days.

(21) Appl. No.: 11/543,570

(22) Filed: Oct. 4, 2006

(65) Prior Publication Data

US 2008/0084194 A1 Apr. 10, 2008

(51) Int. Cl.
*G05F 1/40* (2006.01)
*H02M 3/335* (2006.01)

(52) U.S. Cl. .................................. 323/271; 363/21.01
(58) Field of Classification Search .................. 323/271, 323/272, 280, 281, 282, 284, 285; 363/16, 363/20, 21.01, 21.12, 21.13, 21.17, 21.08
See application file for complete search history.

(56) References Cited

U.S. PATENT DOCUMENTS 7,304,462 B2 * 12/2007 Shvarts ........................ 323/284
7,368,898 B2 * 5/2008 Sutardja et al. ............. 323/285
2006/0158909 A1 * 7/2006 Hawley ..................... 363/21.12

\* cited by examiner

*Primary Examiner*—Adolf Berhane
(74) *Attorney, Agent, or Firm*—Blakely Sokoloff Taylor & Zafman LLP (57) ABSTRACT

An apparatus and method of providing a pulse width modulated signal that is responsive to a current are disclosed. An integrated circuit according to aspects of the present invention regulates an output of a power supply and includes a switch coupled to receive an external current. The integrated circuit also includes a controller coupled to the switch to control a switching of the external current by the switch in response to an external control signal and an internal current sense signal. The internal current sense signal is proportional to a current in the switch. The output of the power supply is also regulated in the absence of the internal current sense signal.

15 Claims, 6 Drawing Sheets

INTEGRATED SWITCH WITH INTERNALLY ADJUSTED CONDUCTION TIME

BACKGROUND INFORMATION

1. Field of the Disclosure

The present invention relates generally to power supplies and, more specifically, the present invention relates to the control of a switch in a switching power supply.

2. Background

In known switching power supplies, a switch is switched on and off to regulate the power that is delivered to an output of the power supply from an input of the power supply in response to a control signal. The control signal is a feedback signal that regulates the output. There is typically a one-to-one correspondence between the value of the feedback signal and the desired conduction time of the switch. Thus, for a given set of operating conditions, the value of the feedback signal alone determines the conduction time of the switch.

In a known power supply where the conduction time of the switch responds only to the feedback signal, any disturbance in the operation of the power supply must propagate through the system until the disturbance appears in the feedback signal before the switch can respond. The feedback circuit is usually slow to respond because it is designed to regulate the average value of an output over many switching periods. Therefore, transient events such as start-up can cause undesirable deviations in voltage and current within the power supply before the control circuit can establish the desired steady state conditions.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for controlling a switch in a switching power supply are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or subcombinations in one or more embodiments. In addition, it is appreciated that the figures provided herewith are for explanation purposes to persons ordinarily skilled in the art and that the drawings are not necessarily drawn to scale.

In various examples of circuits according to the teachings of the present invention, the control of a switch in a switching power supply is described. In one example, the switch and a control circuit are included in an integrated circuit. The control circuit receives a control signal that corresponds to a desired conduction time of the switch. In every switching period, the control circuit makes a small reduction in the desired conduction time in response to the current in the switch during that switching period. This reduction of conduction time that is independent of the control signal improves the response of the power supply to transient disturbances in accordance with the teachings of the present invention. A reduction in the conduction time of the switch for an increase in switch current in each switching period produces a damping effect that restricts deviations from transient disturbances, reduces complexity of the feedback circuit, and increases the stability of the regulated power supply in accordance with the teachings of the present invention.

In one example, a switch is integrated with a mechanism that is integral with the switch to make the conduction time of the switch dependent on the current in the switch in accordance with the teachings of the present invention. The dependence of the conduction time on the current is an inherent property of the integrated switch. No external connections or components are required to benefit from the feature. In one example, the integrated switch senses the current in the switch as a voltage developed across a metal conductor that is part of the integrated circuit in accordance with the teachings of the present invention.

Figure 1:
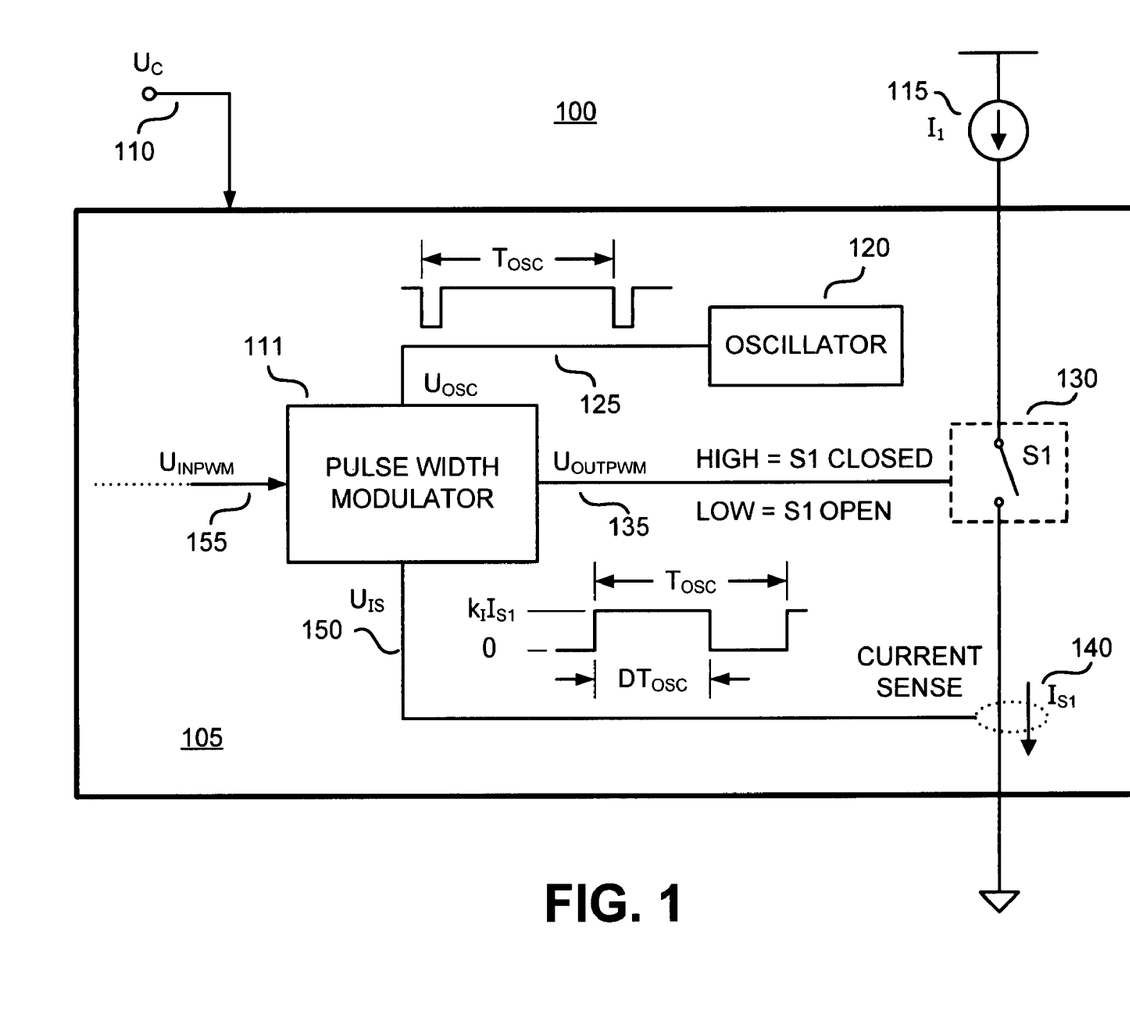
FIG. 1 shows generally an application 100 of one example of an integrated circuit 105 in accordance with the teachings of the present invention.

To illustrate, FIG. 1 shows generally an application 100 of one example of an integrated circuit 105 in accordance with the teachings of the present invention. As shown, an integrated circuit 105 receives a control signal $U_C$ 110 that may be a voltage or a current. A pulse width modulator 111 receives an input signal $U_{INPWM}$ 155 that is related to control signal $U_C$ 110. The pulse width modulator 111 also receives a periodic timing signal $U_{OSC}$ 125 from an oscillator 120. Timing signal $U_{OSC}$ 125 may be a voltage or a current that has a period $T_{OSC}$. Pulse width modulator 111 produces an output $U_{OUTPWM}$ 135 that may be a voltage or a current coupled to switch a switch S1 130. Switch S1 130 switches an external current $I_1$ 115 that is coupled to be received by integrated circuit 105. Switch S1 130 conducts for a fraction D of period $T_{OSC}$ where D is the duty ratio. The current $I_{S1}$ 140 in switch S1 130 is sensed as an internal signal $U_{IS}$ 150 that may be a voltage or a current that is related to current $I_{S1}$ 140 by the factor $k_I$ such that $$U_{IS} = k_I I_{S1} \tag{1}$$

In the example, the factor $k_I$ has units or dimensions of resistance when the internal current sense signal $U_{IS}$ 150 is a voltage. The factor $k_I$ is dimensionless when the current sense signal $U_{IS}$ 150 is a current. The pulse width modulator 111 receives current sense signal $U_{IS}$ 150 to adjust the duty ratio D in accordance with the teaching of the invention. In one example, it is noted that the current in the switch, $I_{S1}$, is an analog signal having a continuum of values and therefore, the conduction time of the switch as affected by the duty ratio D is responsive to a continuum of values of the current $I_{S1}$ in the switch in accordance with the teachings of the present invention. In one example, the continuum of values of the current in the switch, $I_{S1}$, ranges between substantially zero current and a maximum permissible current in the switch in accordance with the teachings of the present invention.

Figure 2:
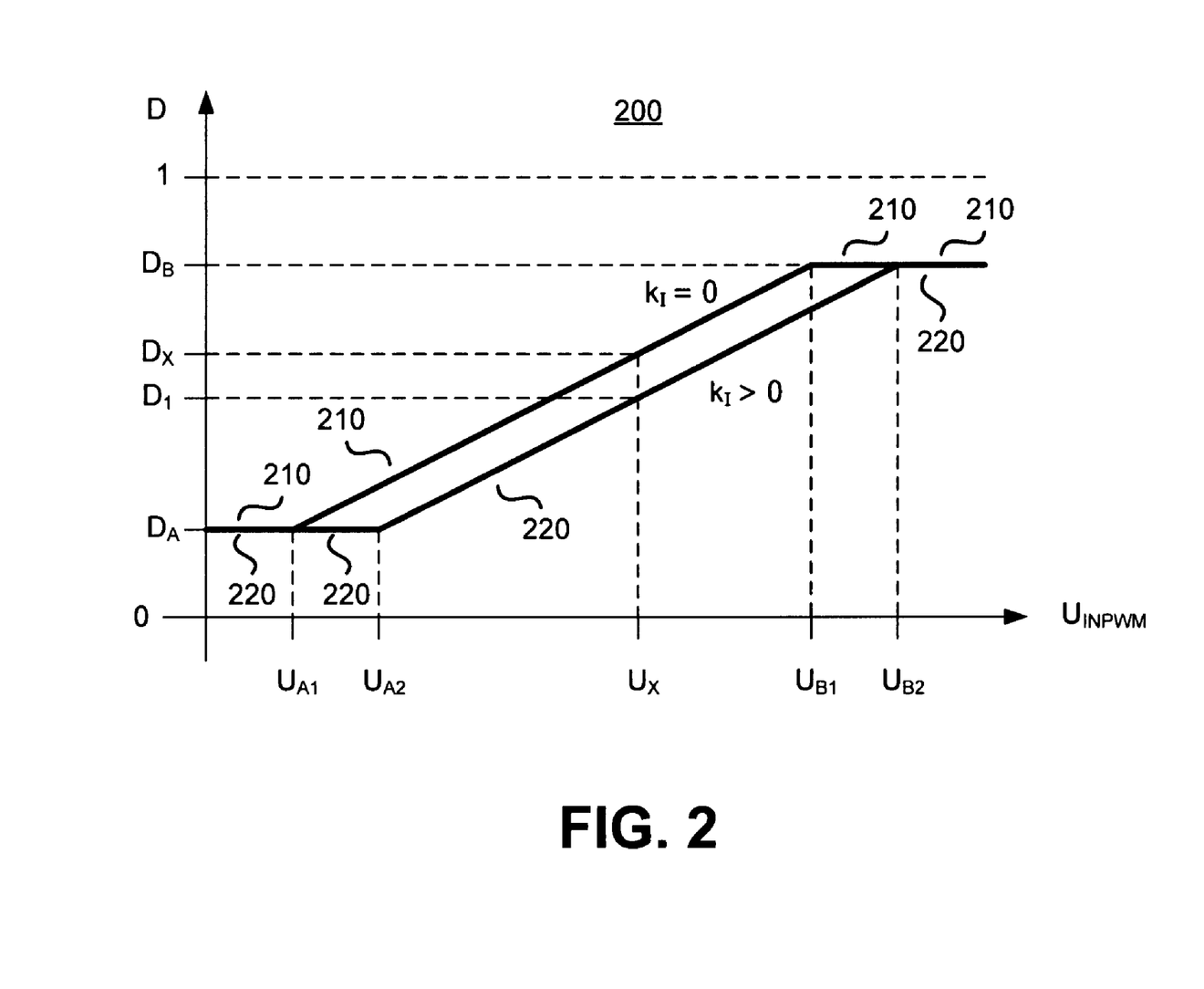
FIG. 2 is a graph 200 that illustrates generally the behavior of the pulse width modulator 111 according to the example of FIG. 1 in accordance with the teachings of the present invention.

FIG. 2 is a graph 200 that illustrates generally the behavior of the pulse width modulator 111 in the example of FIG. 1. Characteristic line segments 210 and 220 show the value of duty ratio D of switch S1 130 in response to the input signal $U_{INPWM}$ 155 for two values of the current sense signal $U_{IS}$ 150. Line segments 210 give the value of duty ratio D when the current sense signal $U_{IS}$ 150 is always zero, corresponding to a zero value for the factor $k_I$. Line segments 220 give the value of duty ratio D when the current sense signal $U_{IS}$ 150 is a nonzero fraction of the current $I_{S1}$ 150 in switch S1 130.

FIG. 2 shows that the duty ratio D is between zero and one, increasing linearly from a minimum value $D_A$ to a maximum value $D_B$ as the input signal $U_{INPWM}$ increases from a value $U_{A1}$ or $U_{A2}$ to a greater value $U_{B1}$ or $U_{B2}$, respectively. For an input signal $U_{INPWM}$ with value $U_X$ between $U_{A2}$ and $U_{B1}$, the presence of a nonzero current sense signal $U_{IS}$ 150 reduces the duty ratio from a value $D_X$ to a lower value $D_1$. The value of $D_1$ decreases as the value of $U_{IS}$ increases.

Figure 3:
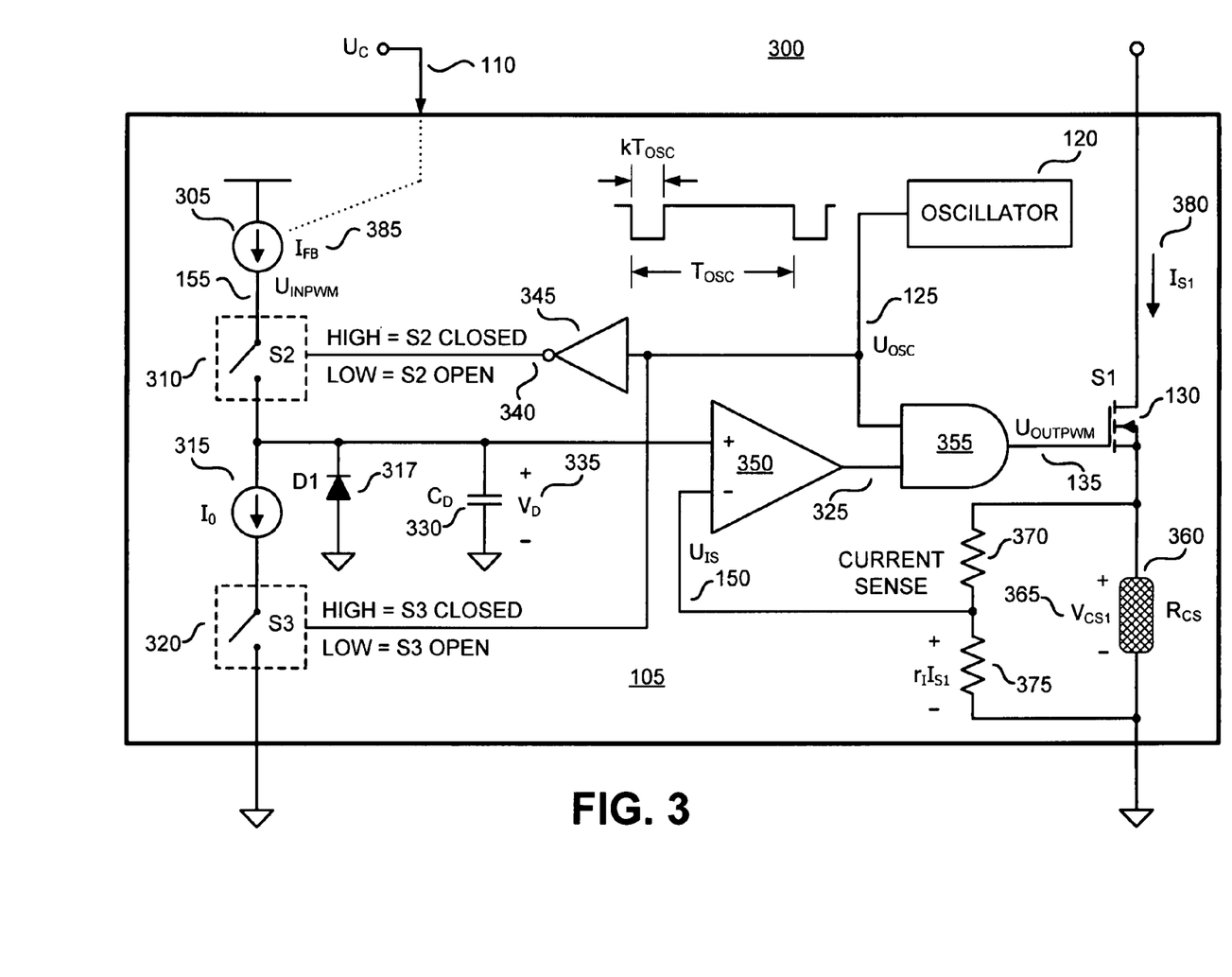
FIG. 3 illustrates generally one example 300 of an integrated switch included in an integrated circuit 105 in accordance with the teaching of the invention.

FIG. 3 illustrates generally one example 300 of an integrated switch included in an integrated circuit 105 in accordance with the teaching of the invention. Integrated circuit 105 includes a pulse width modulator comprising current sources 305 and 315, switches 310 and 320, diode D1 317, capacitor $C_D$ 330, inverter 345, comparator 350, and AND gate 355. An oscillator 120 produces a timing signal $U_{OSC}$ 125 that is periodic with period $T_{OSC}$. Timing signal $U_{OSC}$ 125 from oscillator 120 is low for a fraction k of the period $T_{OSC}$. Timing signal $U_{OSC}$ is coupled to the input of the inverter 345 and to an input of AND gate 355. Switch S2 310 is coupled be closed when the output 340 of inverter 345 is high. Switch S3 320 is coupled to be closed when timing signal $U_{OSC}$ is high. One skilled in the art will appreciate that current sources 115, 305, and 315 have finite compliance voltages that cause their currents to become zero when the respective switches S1 130, S2 310, and S3 320 are open.

In one example, switch S1 130 is a metal oxide field effect transistor (MOSFET) coupled to receive a signal $U_{OUTPWM}$ 135 from the output of AND gate 355 that is also the output of the pulse width modulator. Integrated transistor switch S1 130 switches a current external to the integrated circuit. In the example, integrated transistor switch S1 130 conducts the switched current $I_{S1}$ 380 when the signal $U_{OUTPWM}$ 135 is high. A current sense network includes a current sensing element 360, a resistor 370, and a resistor 375. In one example, the current sensing element 360 is a portion of a layer of metal that is deposited during the fabrication of the integrated circuit to make electrical connections between regions of the integrated circuit. In one example, the current sensing element 360 has a resistance $R_{CS}$. The switched current $I_{S1}$, 380 is sensed as a voltage $V_{CS1}$ 365 on current sensing element 360. As shown, resistors 370 and 375 together form a resistor divider, which is coupled across current sensing element 360 and scales the voltage $V_{CS1}$ 365 to a current sense voltage $r_I I_{S1}$ that is the current sense signal $U_{IS}$ 150.

In the example, integrated circuit 105 receives a control signal $U_C$ 110 that determines the value of a current $I_{FB}$ 385 from a current source 305. Current $I_{FB}$ 385 is the input signal $U_{INPWM}$ 155 of the pulse width modulator 111 shown in FIG. 1. Capacitor $C_D$ 330 charges with current $I_{FB}$ 385 from current source 305 through switch S2 310 while the timing signal $U_{OSC}$ 125 is low. Capacitor $C_D$ 330 discharges with a substantially fixed current $I_0$ from current source 315 through switch S3 when the timing signal $U_{OSC}$ 125 is high. Diode D1 317 places a lower limit on voltage $V_D$ 335. Comparator 350 compares the voltage $V_D$ 335 on capacitor $C_D$ 330 to the internal current sense signal $U_{IS}$ 150. The output 325 of comparator 350 is high when the voltage $V_D$ 335 on capacitor $C_D$ 335 is greater than the current sense signal $U_{IS}$ 150. The output 325 of comparator 350 is low when the voltage $V_D$ 335 on capacitor $C_D$ 335 is less than or equal to the current sense signal $U_{IS}$ 150. Thus, integrated circuit 105 switches an integrated switch S1 130 periodically with period $T_{OSC}$ and a conduction time determined jointly by or responsive to both the control signal $U_C$ 110 and the switched current $I_{S1}$ 380 in accordance with the teachings of the present invention.

Figure 4:
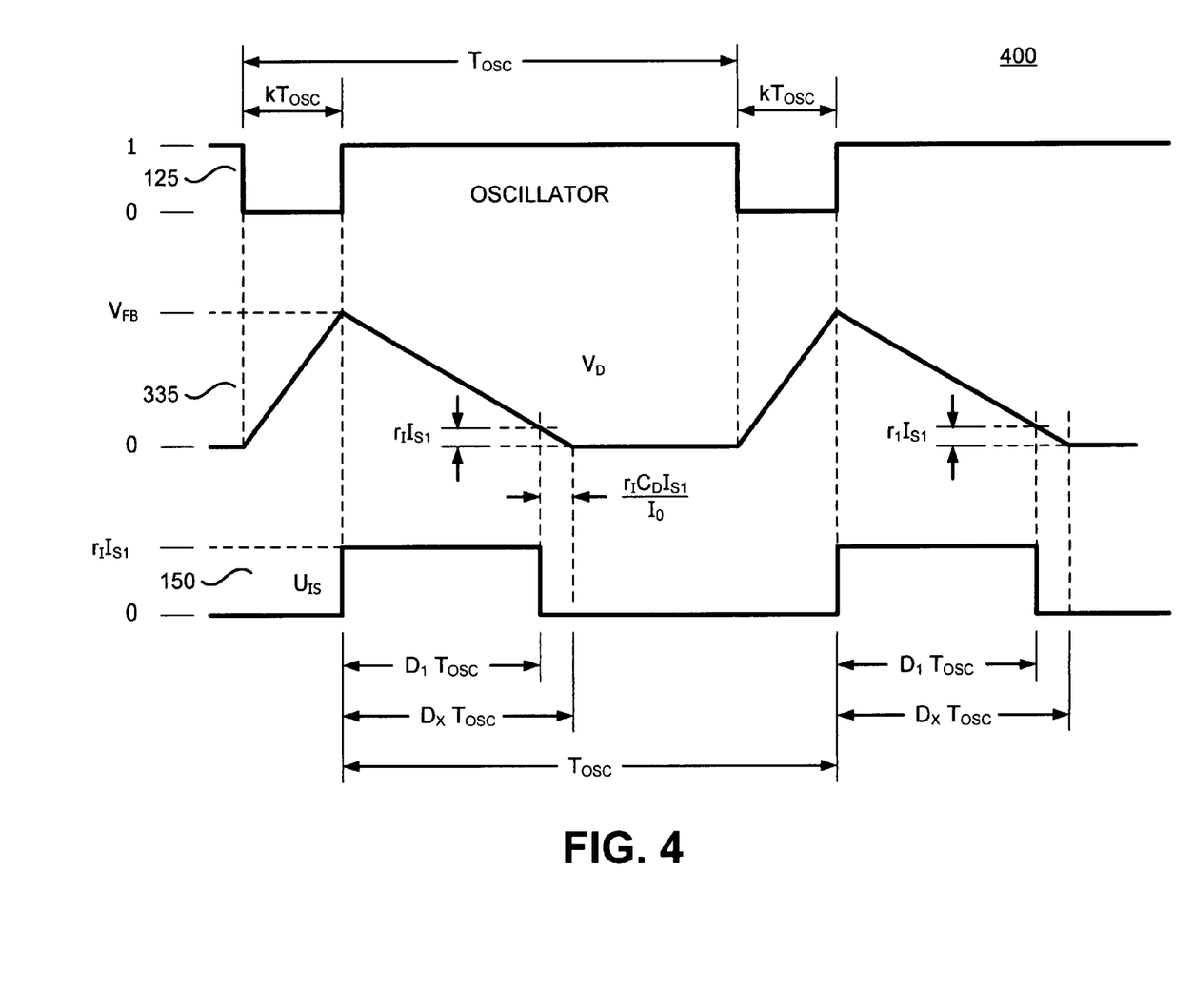
FIG. 4 shows generally waveforms that illustrate the timing relationships 400 of signals for the example integrated switch 300 of FIG. 3 in accordance with the teachings of the present invention.

FIG. 4 shows generally example waveforms that illustrate timing relationships 400 of signals for the example integrated switch 300 of FIG. 3. Capacitor $C_D$ 330 charges with current $I_{FB}$ 385 from current source 305 for a time $kT_{OSC}$ to reach a voltage $V_{FB}$ when timing signal $U_{OSC}$ 125 goes high. Switch S1 130 then begins to conduct current $I_{S1}$ 380. In the example illustrated in FIG. 4, switched current $I_{S1}$ 380 is a constant current while switch S1 130 is conducting. Capacitor $C_D$ 330 then discharges with current $I_0$ from current source 315. Switch S1 130 stops conducting when the voltage $V_D$ on capacitor $C_D$ reaches the value of current sense signal $U_{IS}$ 150. Thus, conduction time of switch S1 is influenced by the value of the current $I_{S1}$ 380 in switch S1 130. For a given value of a control signal $U_C$ 110, the conduction time of the integrated switch S1 130 is reduced by an amount proportional to the internal current sense signal $U_{IS}$ 150. Therefore, FIG. 4 shows how the duty ratio D in FIG. 2 is reduced from the value $D_X$ to the value $D_1$ by the influence of the internal current sense signal $U_{IS}$ 150 in accordance with the teachings of the present invention. Thus in the example, the adjustment to the duty ratio D, or the conduction time, of the switch in response to the internal current sense signal $U_{IS}$ 150 is proportional to the current $I_{S1}$ 380 in the switch S1 130 in accordance with the teachings of the present invention.

Figure 5:
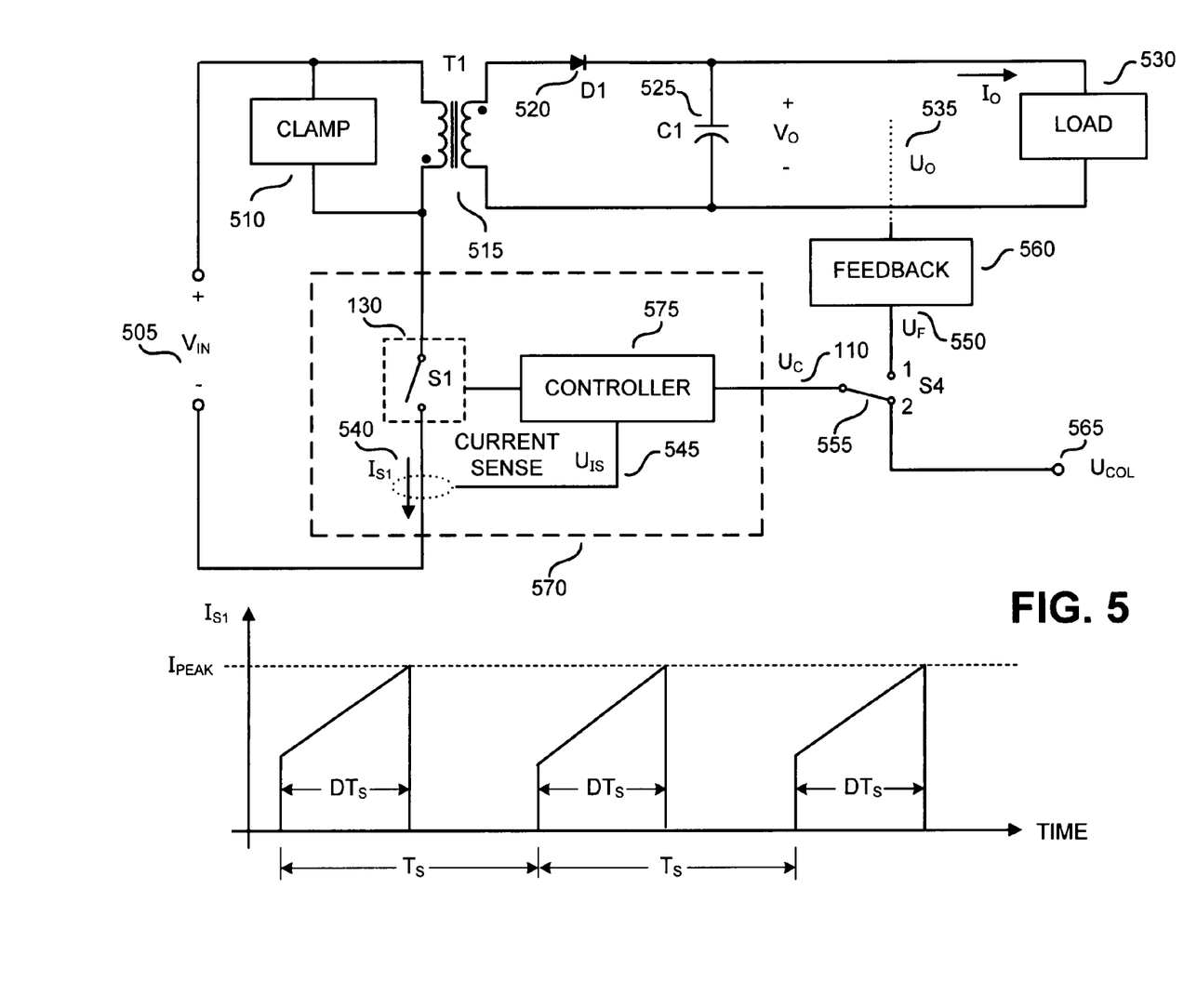
FIG. 5 illustrates generally an example switching power supply in accordance with the teachings of the present invention.

FIG. 5 illustrates generally an example of a switching power supply in accordance with the teachings of the present invention. In the illustrated example, the topology of the power supply in FIG. 5 is known as a flyback regulator. It is appreciated that there are many topologies and configurations of switching regulators, and that the flyback topology shown in FIG. 5 is provided for explanation purposes and that other power supply topologies may be included in accordance with the teachings of the present invention.

As shown in the illustrated example, the power supply in FIG. 5 provides output power to a load 530 from an unregulated input voltage $V_{IN}$ 505. The input voltage $V_{IN}$ 505 is coupled to an energy transfer element T1 515 and an integrated switch S1 130. In the example of FIG. 1, it is noted that the energy transfer element T1 515 may be coupled between an input of the power supply and an output of the power supply. In the example of FIG. 5, the energy transfer element T1 515 is illustrated as a transformer with two windings. In general, the transformer can have more than two windings, with additional windings to provide power to additional loads, to provide bias voltages, or to sense the voltage at a load. In the example illustrated in FIG. 5, a clamp circuit 510 is coupled to the primary winding of the energy transfer element T1 525 to control the maximum voltage on the integrated switch S1 130 included in an integrated circuit 570.

In the example, integrated switch S1 130 is switched on and off in response to an example controller circuit 575 that includes an oscillator and a pulse width modulator in accordance with the teachings of the present invention. In one example, switch S1 130 is a transistor such as for example a power metal oxide semiconductor field effect transistor (MOSFET). In operation, example integrated switch S1 130 produces pulsating current in the rectifier D1 520 that is filtered by capacitor C1 525 to produce a substantially constant output voltage $V_O$ or a substantially constant output current $I_O$ at the load 530.

In one example, the output quantity to be regulated is $U_O$ 535, which in general could be an output voltage $V_O$, an output current $I_O$, or a combination of the two. In the example, the regulated quantity is not necessarily fixed, but can be regulated to change in a desired way in response to a feedback signal. A feedback circuit 560 is coupled to the output quantity $U_O$ 535 to produce a feedback signal $U_F$ 550 that may be an external input $U_C$ 110 to the controller 575 that is included in the integrated circuit 570. An internal input to the controller 545 is the current sense signal $U_{IS}$ 545 that senses a switched current $I_{S1}$ 540 in switch S1 130 in accordance with the teaching of the present invention.

Switched current $I_{S1}$ in the switching power supply example of FIG. 5 is not constant when the switch S1 130 is conducting, but increases linearly to a peak value $I_{PEAK}$ during the conduction time that is a fraction D of a switching period $T_S$. The peak value of the switched current $I_{S1}$ changes with the current $I_O$ in the load 530. In normal operation, controller 575 changes the duty ratio D of the switch in response to feedback signal $U_F$ to regulate the output $U_O$ 535 in response to changes in the input voltage $V_{IN}$ 505 and to changes in the load 530.

In one example, a switch S4 555 is included in the power supply circuit of FIG. 5 that allows the input $U_C$ 110 to be either the feedback signal $U_F$ 550 or a constant open loop signal $U_{COL}$ 565. In the example, when the switch S4 555 is in position 1, the input $U_C$ to the controller 575 is the feedback signal $U_F$. When the switch S4 555 is in position 2, the input $U_C$ to the controller 575 is the constant open loop signal $U_{COL}$ 565. In the example, when the switch in position 2, the influence of the feedback signal is removed, and the duty ratio is responsive only to changes in the peak current $I_{PEAK}$ as will be shown in FIG. 6 in accordance with the teachings of the present invention.

Figure 6:
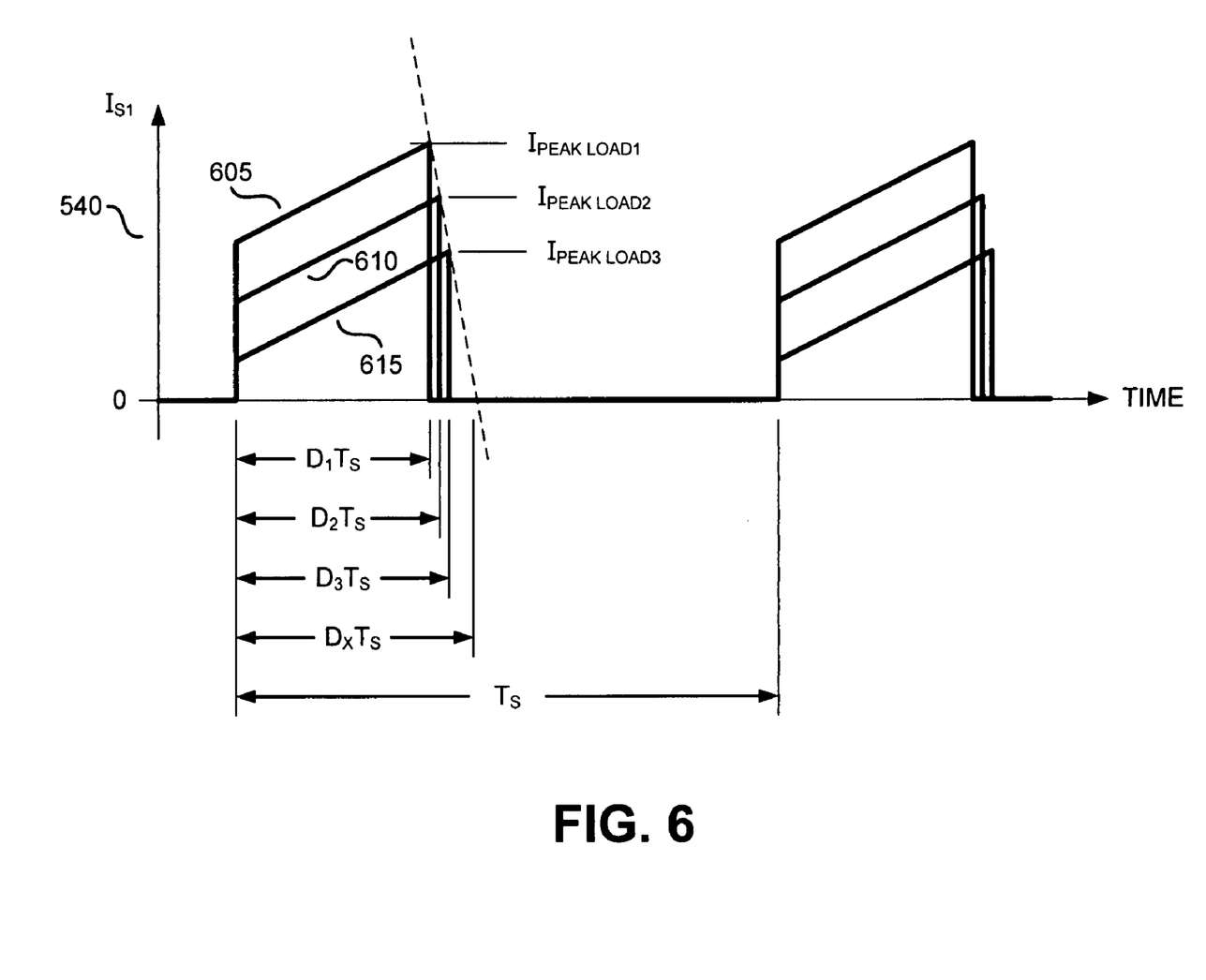
FIG. 6 shows generally example waveforms of the switched current $I_{S1}$ for three different values of the load when the switch is in position 2 to set the input $U_C$ to the constant open loop signal $U_{COL}$ in accordance with the teachings of the present invention.

To illustrate, FIG. 6 shows generally example waveforms of the switched current $I_{S1}$ 540 for three different values of the load 530 when the switch S4 555 is in position 2 to set the input $U_C$ 110 to the constant open loop signal $U_{COL}$ 565. In the example, duty ratio $D_X$ for conduction time $D_X T_S$ corresponds to a condition when current sense signal $U_{IS}$ 545 is reduced to zero. As shown, a finite non-zero current sense signal $U_{IS}$ 545 reduces the duty ratio to $D_1$, $D_2$, and $D_3$, corresponding to conduction times $D_1 T_S$, $D_2 T_S$, and $D_3 T_S$, for respective peak currents $I_{PEAK\ LOAD1}$, $I_{PEAK\ LOAD2}$, and $I_{PEAKLOAD3}$, as shown by respective currents 605, 610, and 615. Thus, the internal current sense signal $U_{IS}$ 545 makes adjustments to the conduction time of the internal switch S1 130 such as currents in the internal integrated switch S1 130 increase, conduction times and corresponding reduced duty ratios of the switch S1 130 are reduced in accordance with the teachings of the present invention. Therefore, the adjustment to the conduction time by the current sense signal $U_{IS}$ 545 is not sufficient to appreciably affect the regulation of the output $U_O$ 535. In normal operation, with the switch S4 555 in position 1 such that the input $U_C$ is the feedback signal $U_F$ 550, the output $U_O$ 535 of the power supply remains in regulation when the current sense signal $U_{IS}$ is absent. In other words, the output of the power supply is regulated even in the absence of the internal current sense signal in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An integrated circuit that regulates an output of a power supply, the integrated circuit comprising:
   a switch coupled to receive an external current; and
   a controller coupled to the switch to control a switching of the external current by the switch in response to an external control signal and an internal current sense signal, wherein the controller is further coupled to make an adjustment to a conduction time of the switch in response to the internal current sense signal and wherein the adjustment to the conduction time of the switch is proportional to the external current through the switch.

2. The integrated circuit of claim 1 wherein the conduction time of the switch is responsive to the external control signal and the internal current sense signal.

3. The integrated circuit of claim 1 wherein the conduction time of the switch is responsive to a continuum of values of the current in the switch, the continuum of values ranging between substantially zero current and a maximum permissible current in the switch.

4. The integrated circuit of claim 1 wherein the adjustment to the conduction time of the switch is a reduction in the conduction time of the switch in response to an increase in the current in the switch.

5. The integrated circuit of claim 1 wherein the current sense signal is a first voltage, the first voltage being proportional to the current in the switch and the resistance of a metal conductor that makes connections between regions of the integrated circuit.

6. The integrated circuit of claim 1 further comprising an oscillator coupled to a pulse width modulator, wherein the pulse width modulator is coupled to the oscillator to produce an output that has a duty ratio of the switch responsive to the external control signal and the internal current sense signal.

7. The integrated circuit of claim 6 wherein the switch is coupled to an output of the pulse width modulator.

8. A method of controlling an output of a power supply, comprising:
receiving an external current with a switch;
controlling a switching of the switch in response to an external control signal and an internal current sense signal; and
adjusting a conduction time of the switch signal and wherein the adjustment to the conduction time of the switch is proportional to the external current.

9. The method of claim 8, wherein controlling the switching of the switch in response to the external control signal, comprises:
generating a voltage across a capacitor responsive to the external control signal;
comparing the voltage across the capacitor to a current sense signal; and
enabling the switch if the voltage across the capacitor is greater than the current sense signal.

10. The method of claim 9, further comprising periodically discharging the voltage across the capacitor responsive to a timing signal.

11. The apparatus of claim 1, wherein the controller comprises:
a charging current source coupled to generate a charging current having a value responsive to the external control signal; and
a first switch coupled between the charging current source and a capacitor to selectively generate a voltage across the capacitor responsive to the charging current.

12. The apparatus of claim 11, wherein the controller further comprises:
a discharging current source coupled to the capacitor to discharge the voltage across the capacitor; and
a second switch coupled to the discharging current source to selectively enable current to flow from the discharging current source.

13. The apparatus of claim 12, wherein the controller further comprises an oscillator coupled to provide a timing signal to the first switch and the second switch to control a duration of charging and discharging of the capacitor.

14. The apparatus of claim 11, further comprising a diode coupled to the capacitor, wherein the diode is further coupled to impose a lower voltage limit on the capacitor.

15. The apparatus of claim 11, wherein the controller further comprises:
a voltage divider coupled to receive the external current from the switch to produce a current sense voltage; and
a comparator coupled to the voltage divider and the capacitor to compare the voltage across the capacitor to the current sense voltage.

\* \* \* \* \*